(12) United States Patent
Zhang et al.

(10) Patent No.: US 12,381,618 B2
(45) Date of Patent: Aug. 5, 2025

(54) RELAY AMPLIFICATION METHOD AND SYSTEM FOR WIRELESS SIGNAL AND STORAGE MEDIUM

(71) Applicant: SPREADTRUM COMMUNICATIONS (SHANGHAI) CO., LTD., Shanghai (CN)

(72) Inventors: Yongsheng Zhang, Shanghai (CN); Jiaxuan Chen, Shanghai (CN); Qiao Zhang, Shanghai (CN); Bin Liu, Shanghai (CN); Xinfa Liang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 388 days.

(21) Appl. No.: 18/006,032
(22) PCT Filed: Jul. 5, 2021
(86) PCT No.: PCT/CN2021/104535
§ 371 (c)(1),
(2) Date: Jan. 19, 2023
(87) PCT Pub. No.: WO2022/017166
PCT Pub. Date: Jan. 27, 2022

(65) Prior Publication Data
US 2023/0353229 A1 Nov. 2, 2023

(30) Foreign Application Priority Data
Jul. 21, 2020 (CN) .......................... 202010702097.6

(51) Int. Cl.
*H04B 7/155* (2006.01)
(52) U.S. Cl.
CPC .................. *H04B 7/15535* (2013.01)
(58) Field of Classification Search
CPC ................................ H04B 7/15535
See application file for complete search history.

(56) References Cited

U.S. PATENT DOCUMENTS

| 6,249,554 | B1 | 6/2001 | Mobin et al. |
| 2007/0165581 | A1* | 7/2007 | Mehta ............... H04W 40/06 370/338 |

(Continued)

FOREIGN PATENT DOCUMENTS

| CN | 1707987 A | 12/2005 |
| CN | 101826848 A | 9/2010 |

(Continued)

OTHER PUBLICATIONS

WIPO, International Search Report and Written Opinion for International Application No. PCT/CN2021/104535, Oct. 11, 2021.
(Continued)

*Primary Examiner* — Hsinchun Liao
(74) *Attorney, Agent, or Firm* — HAUPTMAN HAM, LLP (57) ABSTRACT

A relay amplification method and system, and a storage medium are provided in the present disclosure. The relay amplification system includes a first antenna, a first RF transceiver, a second RF transceiver, and a second antenna which are connected in sequence, and the relay amplification method includes: determining whether power of a first I/Q signal output by the first RF transceiver changes with respect to power of a second I/Q signal output by the first RF transceiver; and if yes, controlling a gain of power adjustment for the first RF transceiver and a gain of power adjustment for the second RF transceiver respectively according to a power variation of the first I/Q signal, to make the power of the first I/Q signal remain unchanged with respect to the power of the second I/Q signal and a link gain between the first antenna and the second antenna remain unchanged.

20 Claims, 3 Drawing Sheets

(56) References Cited

U.S. PATENT DOCUMENTS

| | | | |
|---|---|---|---|
| 2008/0260388 A1 | 10/2008 | Kim et al. | |
| 2008/0293360 A1 | 11/2008 | Maslennikov et al. | |
| 2016/0294467 A1 | 10/2016 | Riphagen | |
| 2018/0026731 A1 | 1/2018 | Kim | |
| 2021/0194515 A1* | 6/2021 | Go | H04B 1/401 |

FOREIGN PATENT DOCUMENTS

| | | | |
|---|---|---|---|
| CN | 101959288 A | 1/2011 |
| CN | 101965695 A | 2/2011 |
| CN | 103428157 A | 12/2013 |
| CN | 104243059 A | 12/2014 |
| CN | 106561009 A | 4/2017 |
| CN | 107623544 A | 1/2018 |
| CN | 111082832 A | 4/2020 |
| CN | 112737609 A | 4/2021 |

OTHER PUBLICATIONS

The first office action issued in corresponding CN application No. 202010702097.6 dated Aug. 16, 2021.
Notice of allowance issued in corresponding CN application No. 202010702097.6 dated Jan. 14, 2022.

* cited by examiner

RELAY AMPLIFICATION METHOD AND SYSTEM FOR WIRELESS SIGNAL AND STORAGE MEDIUM

CROSS-REFERENCE TO RELATED APPLICATION(S)

This application is a National Stage of International Application No. PCT/CN2021/104535, field Jul. 5, 2021, which claims priority to Chinese Patent Application No. 202010702097.6, filed Jul. 21, 2020, the entire disclosure of which are hereby incorporated by reference.

TECHNICAL FIELD

This disclosure relates to the field of wireless communications, and in particular, to a relay amplification method and system for a wireless signal, and a storage medium.

BACKGROUND

In a wireless relay mode, a wireless access point (AP) plays a role of relay in network connection, and can relay and amplify a signal, thereby expanding a coverage of a wireless network. With aid of a relay amplification apparatus for a wireless signal, a signal in a space sent by a base station is received and amplified within a certain area for use by a nearby user terminal, thereby effectively solving a problem of using a user terminal in a weak signal area. In the related art, the relay amplification apparatus for a wireless signal includes an indoor distribution system, a repeater, etc. The indoor distribution system is a solution aiming at an indoor user group and is used for improving an indoor communication environment. Signals from a mobile base-station are uniformly distributed at each corner in an indoor area by using an indoor antenna distribution system, thereby ensuring that an ideal signal coverage can be achieved in the indoor area. A repeater refers to a radio transmission relay device used for signal enhancement in a radio communication transmission process, and can amplify and forward signals received from a mobile station and a base station, thereby increasing indoor or outdoor network coverage.

SUMMARY

In a first aspect of the present disclosure, a relay amplification method for a wireless signal is provided. The relay amplification method for a wireless signal is applied to a relay amplification system for a wireless signal, the relay amplification system includes a first antenna, a first radio frequency (RF) transceiver, a second RF transceiver, and a second antenna which are connected in sequence, and the relay amplification method includes the following. Determine whether power of a first in-phase/quadrature (I/Q) signal output by the first RF transceiver changes with respect to power of a second I/Q signal output by the first RF transceiver, the first I/Q signal being an I/Q signal corresponding to a current sub-frame received by the first antenna, and the second I/Q signal being an I/Q signal corresponding to a previous sub-frame received by the first antenna. If the power of the first I/Q signal output by the first RF transceiver changes with respect to the power of the second I/Q signal output by the first RF transceiver, control a gain of power adjustment for the first RF transceiver and a gain of power adjustment for the second RF transceiver respectively according to a power variation of the first I/Q signal, so that the power of the first I/Q signal remains unchanged with respect to the power of the second I/Q signal and a link gain between the first antenna and the second antenna remain unchanged.

In a second aspect of the present disclosure, a relay amplification system for a wireless signal is provided. The relay amplification system for a wireless signal includes a first antenna, a first RF transceiver, a second RF transceiver, and a second antenna which are connected in sequence and a baseband chip, where the baseband chip is configured to execute the relay amplification method for a wireless signal in the first aspect.

In a third aspect of the present disclosure, a non-transitory computer readable storage medium is provided. The computer readable storage medium stores computer programs, where when executed by a processor, the computer programs are configured to execute the relay amplification method for a wireless signal in the first aspect.

DETAILED DESCRIPTION

The present disclosure will be further described with reference to implementations below, but is not limited to the described implementations.

The positive improvement effect of the present disclosure lies in that the gain of power adjustment for the first RF transceiver and the gain of power adjustment for the second RF transceiver are separately controlled according to the power variation of the first I/Q signal, so that the power of the first I/Q signal remains unchanged with respect to the power of the second I/Q signal, and the link gain between the first antenna and the second antenna remains unchanged, which ensures that the relay amplification system is always in a fixed-gain state during working, for example, during uplink or downlink, and avoids power attenuation of a wireless signal during relay amplification.

Figure 1:
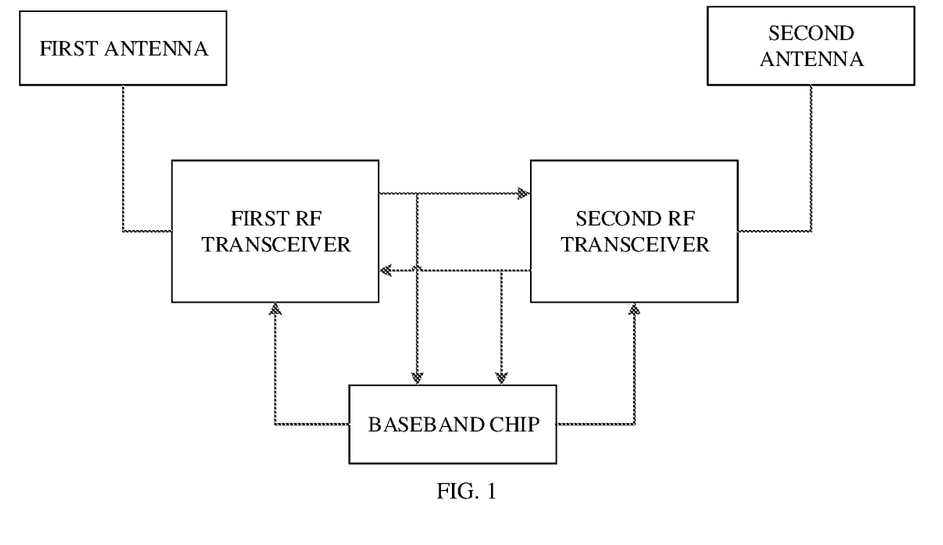
FIG. 1 is a structural block diagram of a relay amplification system for a wireless signal provided in an implementation of the present disclosure.

A relay amplification method for a wireless signal is provided in this implementation. The relay amplification method for a wireless signal is applied to a relay amplification system for a wireless signal. As illustrated in FIG. 1, the relay amplification system includes a first antenna, a first radio frequency (RF) transceiver, a second RF transceiver, and a second antenna which are connected in sequence and a baseband chip. The relay amplification method for a wireless signal provided in this implementation is performed by the baseband chip in the relay amplification system.

In an application scenario, the first antenna is configured to perform wireless communication with a base station, for example, receive data sent by the base station or send data to the base station. The second antenna is configured to perform wireless communication with a user terminal, for example, receive data sent by the user terminal or send data to the user terminal. The user terminal is a mobile station, a mobile terminal, or the like.

In another application scenario, the first antenna is configured to perform wireless communication with the user terminal, for example, receive data sent by the user terminal or send data to the user terminal. The second antenna is configured to perform wireless communication with the base station, for example, receive data sent by the base station or send data to the base station.

Figure 2:
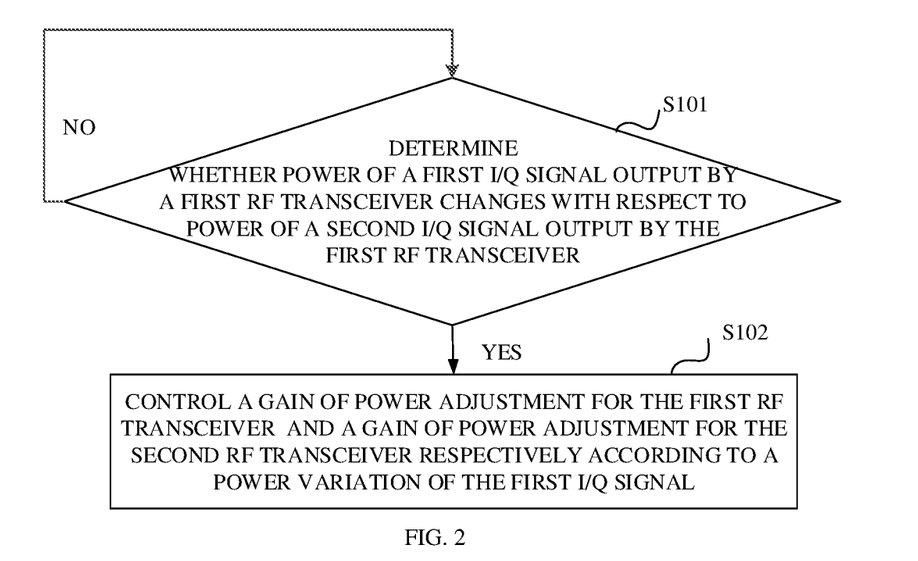
FIG. 2 is a flowchart of a relay amplification method for a wireless signal provided in an implementation of the present disclosure.

The relay amplification method for a wireless signal provided in this implementation, as illustrated in FIG. 2, includes the following.

At block S101, determine whether power of a first I/Q signal output by a first RF transceiver changes with respect to power of a second I/Q signal output by the first RF transceiver. If yes, proceed to operations at S102: otherwise, proceed to operations at S101.

The first I/Q signal is an I/Q signal corresponding to a current sub-frame received by the first antenna, and the second I/Q signal is an I/Q signal corresponding to a previous sub-frame received by the first antenna. In a specific implementation, a signal received by the first antenna consists of one or more sub-frames.

In a specific implementation, an I/Q signal output by a RF transceiver is an analog signal, and the baseband chip includes an analog-to-digital converter (DAC), and the DAC is used for converting the analog signal into a digital signal, so as to perform power judgement.

At block S102, control a gain of power adjustment for the first RF transceiver and a gain of power adjustment for the second RF transceiver respectively according to a power variation of the first I/Q signal, so that the power of the first I/Q signal remains unchanged with respect to the power of the second I/Q signal and a link gain between the first antenna and the second antenna remain unchanged.

In this implementation, after being processed by the first RF transceiver and the second RF transceiver, the signal received by the first antenna is sent out through the second antenna. The first RF transceiver and the second RF transceiver are both configured to adjust, for example, increase or decrease, power of the received signal. The link gain between the first antenna and the second antenna is the sum of the gain of power adjustment for the first RF transceiver and the gain of power adjustment for the second RF transceiver.

In a specific implementation of operations at S102, the baseband chip controls the gain of power adjustment for the first RF transceiver by writing a control word into the first RF transceiver, and controls the gain of power adjustment for the second RF transceiver by writing a control word into the second RF transceiver.

In an optional implementation, the operations at block S102 specifically includes the following. Update the gain of power adjustment for the first RF transceiver by subtracting the power variation of the first I/Q signal from the gain of power adjustment for the first RF transceiver. Update the gain of power adjustment for the second RF transceiver by adding the power variation of the first I/Q signal to the gain of power adjustment for the first RF transceiver.

In this implementation, the power variation of the first I/Q signal may be positive, that is, the power of the first I/Q signal becomes greater than the power of the second I/Q signal: or the power variation of the first I/Q signal may be negative, that is, the power of the first I/Q signal becomes less than the power of the second I/Q signal. In a specific implementation, gains described above are in units of decibel relative to one milliwatt (dBm), and unit conversion needs to be performed according to a formula: dBm=10 log (power value/1 mW) when an addition/subtraction operation is performed on the power variation of the first I/Q signal.

Figure 3:
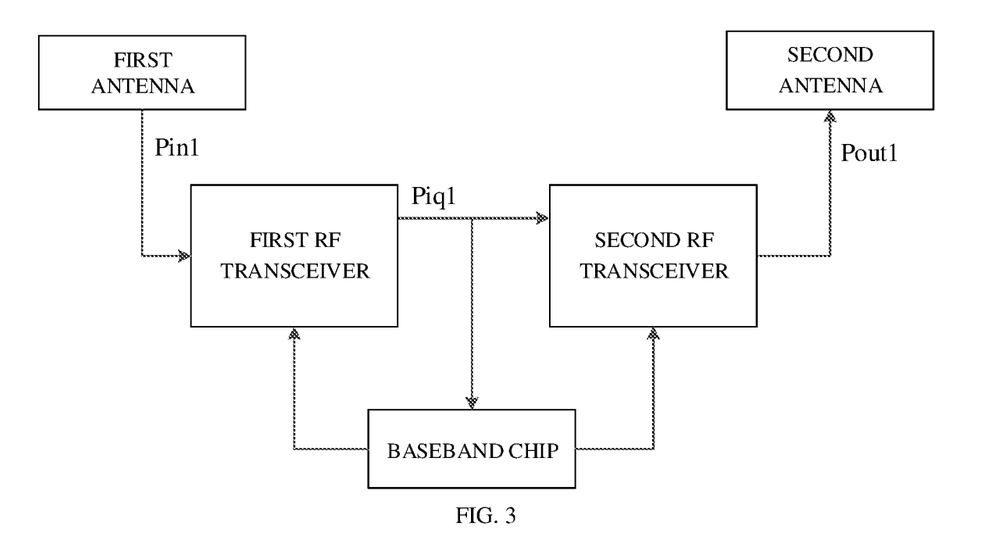
FIG. 3 is a schematic diagram illustrating a signal connection relation of a relay amplification system in a downlink scenario provided in an implementation of the present disclosure.

In a specific example of a downlink scenario, as illustrated in FIG. 3, the first antenna is configured to receive a signal from a base station, the power of the signal is Pin1, an I/Q signal is output after the signal is processed by the first RF transceiver, the power of the I/Q signal is Piq1, a first transmit signal is output after the I/Q signal is processed by the second RF transceiver, the power of the first transmit signal is Pout1, and the first transmit signal is sent out via the second antenna so as to be received by a user terminal. The relay amplification system in this implementation is a linear system. It is assumed that a sub-frame currently received by the first antenna changes by $\Delta$ U1 with respect to a previous sub-frame received by the first antenna in signal power Pin1, and it can be detected by the baseband chip that the power Piq1 of the I/Q signal output by the first RF transceiver also changes by $\Delta$ U1 accordingly. In order to make the power of the first I/Q signal remain unchanged with respect to the power of the second I/Q signal, that is, in order to make Piq1 remain unchanged, and a downlink gain GU1 between the first antenna and the second antenna remain unchanged, the baseband chip controls the gain of power adjustment for the first RF transceiver to be updated from Gagc to Gagc−$\Delta$ U1, and controls the gain of power adjustment for the second RF transceiver to be updated from Gapc to Gapc+$\Delta$ U1. In this case, Piq1=(Pin1+$\Delta$ U1)+(Gagc−$\Delta$ U1)=Pin1+Gagc, the downlink gain GU1=(Gagc-$\Delta$ U1)+ (Gapc+4 U1)=Gagc+Gapc, Pou1=(Pin1+$\Delta$ U1)+GU1. In this implementation, by controlling the power Piq1 of the I/Q signal and the downlink gain GU1 to remain unchanged, the power variation $\Delta$ U1 of the input signal received by the first antenna is transferred to an output signal.

In an optional implementation, the relay amplification method further includes the following. When power of a first transmit signal output by the second RF transceiver to the second antenna reaches a rated power, control the gain of power adjustment for the first RF transceiver and/or the gain of power adjustment for the second RF transceiver according to the power variation of the first I/Q signal, so that the power of the first transmit signal remain at the rated power. In this implementation, only the gain of power adjustment for the first RF transceiver is controlled, so that the power of the first transmit signal remains at the rated power: or only the gain of power adjustment for the second RF transceiver is controlled, so that the power of the first transmit signal remains at the rated power: or the gain of power adjustment for the first RF transceiver and the second RF transceiver are both controlled, so that the power of the first transmit signal remains at the rated power.

In an optional implementation, if the power of the first transmit signal increases to the rated power, the gain of power adjustment for the first RF transceiver is controlled first, so that the power of the first transmit signal remains at the rated power. If the power of the first transmit signal is unable to remain at the rated power by controlling only the gain of power adjustment for the first RF transceiver, the gain of power adjustment for the second RF transceiver is also controlled.

In a specific implementation of the foregoing downlink scenario, the power Pin1 of the previous sub-frame received by the first antenna causes the power of the first transmit signal output by the second RF transceiver to the second antenna to reach the rated power, that is, Pout1=Pin1+GU1=rated P. It is assumed that the sub-frame currently received by the first antenna changes by Δ U1' with respect to the previous sub-frame in signal power Pin1, that is, the power variation of the first I/Q signal is Δ U1', the gain of power adjustment for the first RF transceiver is controlled to be updated from Gagc to Gagc−Δ U1', the gain Gapc of power adjustment for the second RF transceiver remains unchanged, so as to obtain Pout1=(Pin1+Δ U1')+GU1−ΔU1'=Pin1+GU1=rated P, in other words, Pout1 remains at the rated power. In this implementation, the power of the first transmit signal, i. e., the output power, remains at the rated power by decreasing the downlink gain GU1 by Δ U1'.

In an optional implementation, the relay amplification method further includes the following.

At S201, determine whether power of a third I/Q signal output by the second RF transceiver changes with respect to power of a fourth I/Q signal output by the second RF transceiver. If yes, proceed to operations at S202: otherwise, proceed to operations at S201.

The third I/Q signal is an I/Q signal corresponding to a current sub-frame received by the second antenna, and the fourth I/Q signal is an I/Q signal corresponding to a previous sub-frame received by the second antenna. In a specific implementation, the signal received by the second antenna consists of one or more sub-frames.

At S202, control a gain of power adjustment for the second RF transceiver and a gain of power adjustment for the first RF transceiver respectively according to a power variation of the third I/Q signal, so that the power of the third I/Q signal remains unchanged with respect to the power of the fourth I/Q signal and the link gain between the first antenna and the second antenna remain unchanged.

In this implementation, after being processed by the second RF transceiver and the first RF transceiver, the signal received by the second antenna is sent out through the first antenna. The first RF transceiver and the second RF transceiver are both configured to adjust, for example, increase or decrease, power of the received signal.

In an optional implementation, operations at S202 specifically includes the following. Update the gain of power adjustment for the second RF transceiver by subtracting the power variation of the third I/Q signal from the gain of power adjustment for the second RF transceiver. Update the gain of power adjustment for the first RF transceiver by adding the power variation of the third I/Q signal to the gain of power adjustment for the second RF transceiver.

In this implementation, the power variation of the third I/Q signal may be positive, that is, the power of the third I/Q signal becomes greater than the power of the fourth I/Q signal: or the power variation of the third I/Q signal may be negative, that is, the power of the third I/Q signal becomes less than the power of the fourth I/Q signal. In a specific implementation, gains described above are in units of dBm, and unit conversion needs to be performed according to a formula: dBm=10 log (power value/1 mW) when an addition/subtraction operation is performed on the power variation of the third I/Q signal.

Figure 4:
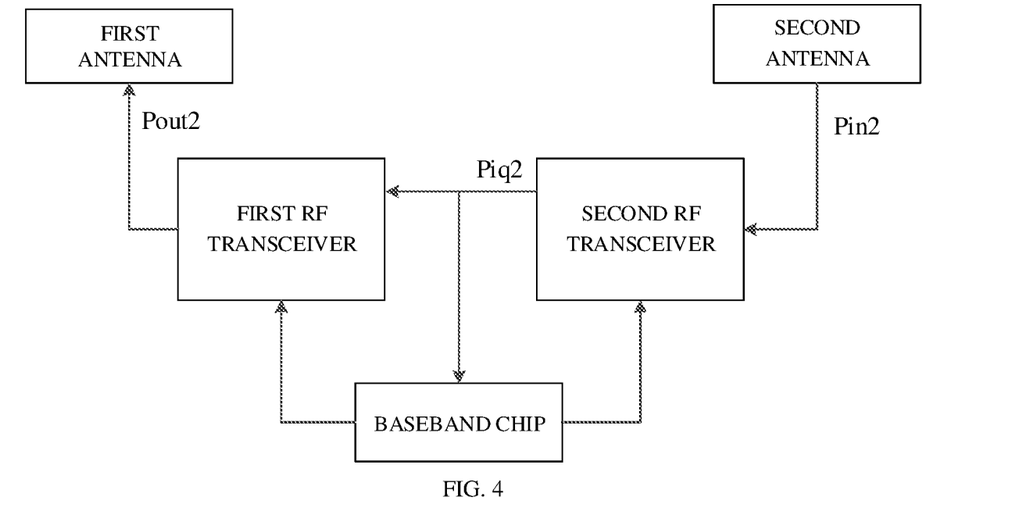
FIG. 4 is a schematic diagram illustrating a signal connection relation of a relay amplification system in an uplink scenario provided in an implementation of the present disclosure.

In a specific example of a uplink scenario, as illustrated in FIG. 4, the second antenna is configured to receive a signal from a user terminal, the power of the signal is Pin2, an I/Q signal is output after the signal is processed by the second RF transceiver, the power of the I/Q signal is Piq2, a second transmit signal is output after the I/Q signal is processed by the first RF transceiver, the power of the second transmit signal is Pout2, and the second transmit signal is sent out via the first antenna so as to be received by a base station. The relay amplification system in this implementation is a linear system. It is assumed that a sub-frame currently received by the second antenna changes by Δ U2 with respect to a previous sub-frame received by the second antenna in signal power Pin1, and it can be detected by the baseband chip that the power Piq2 of the I/Q signal output by the second RF transceiver also changes by Δ U1 accordingly. In order to make the power of the third I/Q signal remain unchanged with respect to the power of the fourth I/Q signal, that is, in order to make Piq2 remain unchanged, and the uplink gain GU1 between the first antenna and the second antenna remain unchanged, the baseband chip controls the gain of power adjustment for the second RF transceiver to be updated from Gagc to Gagc−Δ U2, and controls the gain of power adjustment for the first RF transceiver to be updated from Gapc to Gapc+Δ U2. In this case, Piq2=(Pin2+Δ U2)+(Gagc−Δ U2)=Pin2+Gagc, the uplink gain GU2=(Gagc−Δ U2)+(Gapc+4 U2)=Gagc+Gapc, and Pou2=(Pin2+Δ U2)+GU2. In this implementation, by controlling the power Piq2 of the I/Q signal and the uplink gain GU2 to remain unchanged, the power variation Δ U2 of the input signal received by the second antenna is transferred to an output signal.

In an optional implementation, the relay amplification method further includes the following. When power of a second transmit signal output by the first RF transceiver to the first antenna reaches a rated power, control the gain of power adjustment for the first RF transceiver and/or the gain of power adjustment for the second RF transceiver according to the power variation of the third I/Q signal, so that the power of the second transmit signal remains at the rated power. In this implementation, only the gain of power adjustment for the first RF transceiver is controlled, so that the power of the second transmit signal remains at the rated power: or only the gain of power adjustment for the second RF transceiver is controlled, so that the power of the second transmit signal remains at the rated power: or the gain of power adjustment for the first RF transceiver and the gain of power adjustment for the second RF transceiver are both controlled, so that the power of the second transmit signal remains at the rated power.

In an optional implementation, if the power of the second transmit signal increases to the rated power, the gain of power adjustment for the second RF transceiver is controlled first, so that the power of the second transmit signal remains at the rated power. If the power of the second transmit signal is unable to remain at the rated power by only controlling the gain of power adjustment for the second RF transceiver, the gain of power adjustment for the first RF transceiver is also controlled.

In a specific implementation of the foregoing uplink scenario, the power Pin2 of the previous sub-frame received by the second antenna causes the power of the second transmit signal output by the first RF transceiver to the first antenna to reach the rated power, that is, Pout2=Pin2+GU2=rated P. It is assumed that the sub-frame currently received by the second antenna changes by Δ U2' with respect to the previous sub-frame in signal power Pin2, that is, the power variation of the third I/Q signal is Δ U2', the gain of power adjustment for the second RF transceiver is controlled to be updated from Gagc to Gagc−Δ U2', the gain Gapc of power adjustment for the first RF transceiver remains unchanged, so as to obtain Pout2=(Pin2+Δ U2')+GU2−Δ U2'=Pin2+GU2=rated P, in other words, Pout2 remains at the rated power. In this implementation, the power of the second transmit signal, i. e., the output power, remains at the rated power by decreasing the uplink gain GU2 by Δ U2'.

A relay amplification system for a wireless signal is provided in this implementation, the relay amplification system includes a first antenna, a first RF transceiver, a second RF transceiver, and a second antenna which are connected in sequence, and a baseband chip. The baseband chip is configured to execute the relay amplification method provided in implementations of the present disclosure.

Figure 5:
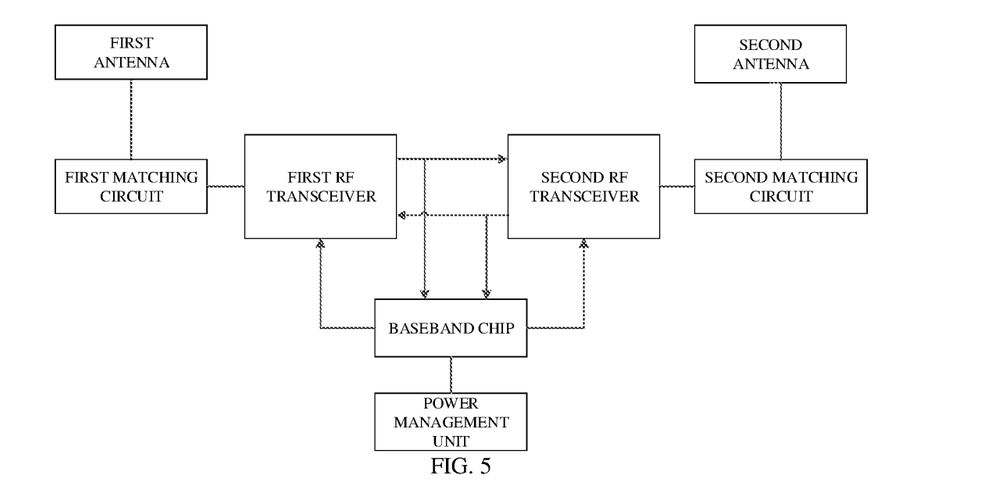
FIG. 5 is a structural block diagram of a relay amplification system for a wireless signal provided in another implementation of the present disclosure.

In an optional implementation, as illustrated in FIG. 5, the relay amplification system further includes a first matching circuit corresponding to the first RF transceiver and a second matching circuit corresponding to the second RF transceiver, where the first matching circuit is connected in series between the first antenna and the first RF transceiver, and the second matching circuit is connected in series between the second antenna and the second RF transceiver.

It can be understood that the first matching circuit is configured to tune a signal received by the first antenna, and the second matching circuit is configured to tune a signal received by the second antenna. The first matching circuit and the second matching circuit each are composed of at least one of: a resistor, a capacitor, an inductor, or a switch.

In an optional implementation, as illustrated in FIG. 5, the relay amplification system further includes a power supply management unit connected with the baseband chip and configured to supply power to the baseband chip.

A non-transitory computer readable storage medium is provided in this implementation, the computer readable storage medium stores computer programs, and when executed by a processor, the computer programs are configured to execute the relay amplification method for a wireless signal provided in implementations of the present disclosure.

The readable storage medium may specifically include but is not limited to a portable disk, a hard disk, a random access memory (RAM), a read-only memory (ROM), an erasable programmable read-only memory (EPROM), an optical storage device, a magnetic storage device, or any proper combination thereof.

In a possible implementation, the present disclosure can also be implemented in the form of a program product, and the program product includes program codes. When the program product is running on a terminal equipment, the program codes are operable with the terminal equipment to execute the relay amplification method for a wireless signal provided in implementations of the present disclosure.

The program codes for implementing the present disclosure may be written in any combination of one or more programming languages, and the program codes may be completely executed on the user equipment, partially executed on the user equipment, executed as a stand-alone software package, partially executed on the user equipment and partially executed on the remote equipment, or completely executed on the remote equipment.

Although specific implementations of the present disclosure have been described above, it should be appreciated by those skilled in the art that the specific implementations are only for illustration and the scope of the present disclosure is defined by the appended claims. Those skilled in the art can make various changes or modifications to these implementations without departing from the principle and essence of the present disclosure, and these changes and modifications shall belong to the scope of protection of the present disclosure.

What is claimed is:

1. A relay amplification method for a wireless signal, applied to a relay amplification system for a wireless signal, the relay amplification system comprising a first antenna, a first radio frequency (RF) transceiver, a second RF transceiver, and a second antenna which are connected in sequence, and the relay amplification method comprising:
   determining whether power of a first in-phase/quadrature (I/Q) signal output by the first RF transceiver changes with respect to power of a second I/Q signal output by the first RF transceiver, the first I/Q signal being an I/Q signal corresponding to a current sub-frame received by the first antenna, and the second I/Q signal being an I/Q signal corresponding to a previous sub-frame received by the first antenna; and
   in response to the power of the first I/Q signal changing with respect to power of the second I/Q signal, controlling a gain of power adjustment for the first RF transceiver and a gain of power adjustment for the second RF transceiver respectively according to a power variation of the first I/Q signal, to make the power of the first I/Q signal remain unchanged with respect to the power of the second I/Q signal and a link gain between the first antenna and the second antenna remain unchanged.

2. The relay amplification method according to claim 1, wherein controlling the gain of power adjustment for the first RF transceiver and the gain of power adjustment for the second RF transceiver respectively according to the power variation of the first I/Q signal comprises:
   updating the gain of power adjustment for the first RF transceiver by subtracting the power variation of the first I/Q signal from the gain of power adjustment for the first RF transceiver; and
   updating the gain of power adjustment for the second RF transceiver by adding the power variation of the first I/Q signal to the gain of power adjustment for the first RF transceiver.

3. The relay amplification method according to claim 1, further comprising:
   in response to power of a first transmit signal output by the second RF transceiver to the second antenna reaching a rated power, controlling the gain of power adjustment for the first RF transceiver and/or the gain of power adjustment for the second RF transceiver according to the power variation of the first I/Q signal, to make the power of the first transmit signal remain at the rated power.

4. The relay amplification method according to claim 1, further comprising:
   determining whether power of a third I/Q signal output by the second RF transceiver changes with respect to power of a fourth I/Q signal output by the second RF transceiver, the third I/Q signal being an I/Q signal corresponding to a current sub-frame received by the second antenna, and the fourth I/Q signal being an I/Q signal corresponding to a previous sub-frame received by the second antenna; and
   in response to the power of the third I/Q signal changing with respect to the power of the fourth I/Q signal, controlling a gain of power adjustment for the second RF transceiver and a gain of power adjustment for the first RF transceiver respectively according to a power variation of the third I/Q signal, to make the power of the third I/Q signal remain unchanged with respect to the power of the fourth I/Q signal and the link gain between the first antenna and the second antenna remain unchanged.

5. The relay amplification method according to claim 4, wherein controlling the gain of power adjustment for the second RF transceiver and the gain of power adjustment for the first RF transceiver respectively according to the power variation of the third I/Q signal comprises:
updating the gain of power adjustment for the second RF transceiver by subtracting the power variation of the third I/Q signal from the gain of power adjustment for the second RF transceiver; and
updating the gain of power adjustment for the first RF transceiver by adding the power variation of the third I/Q signal to the gain of power adjustment for the second RF transceiver.

6. The relay amplification method according to claim 4, further comprising:
in response to power of a second transmit signal output by the first RF transceiver to the first antenna reaching a rated power, controlling the gain of power adjustment for the first RF transceiver and/or the gain of power adjustment for the second RF transceiver according to the power variation of the third I/Q signal, to make the power of the second transmit signal remain at the rated power.

7. A relay amplification system for a wireless signal, comprising a first antenna, a first radio frequency (RF) transceiver, a second RF transceiver, and a second antenna which are connected in sequence and a baseband chip, wherein the baseband chip is configured to;
determine whether power of a first in-phase/quadrature (I/Q) signal output by the first RF transceiver changes with respect to power of a second I/Q signal output by the first RE transceiver, the first I/Q signal being an I/Q signal corresponding to a current sub-frame received by the first antenna, and the second I/Q signal being an I/Q signal corresponding to a previous sub-frame received by the first antenna; and
in response to the power of the first I/Q signal changing with respect to power of the second I/Q signal, control a gain of power adjustment for the first RF transceiver and a gain of power adjustment for the second RF transceiver respectively according to a power variation of the first I/Q signal, to make the power of the first I/Q signal remain unchanged with respect to the power of the second I/Q signal and a link gain between the first antenna and the second antenna remain unchanged.

8. The relay amplification system according to claim 7, further comprising a first matching circuit corresponding to the first RF transceiver and a second matching circuit corresponding to the second RF transceiver, wherein the first matching circuit is connected in series between the first antenna and the first RF transceiver, and the second matching circuit is connected in series between the second antenna and the second RF transceiver.

9. The relay amplification system according to claim 7, further comprising a power management unit connected with the baseband chip.

10. The relay amplification system according to claim 7, wherein in terms of controlling the gain of power adjustment for the first RF transceiver and the gain of power adjustment for the second RF transceiver respectively according to the power variation of the first I/Q signal, the baseband chip is configured to:
update the gain of power adjustment for the first RF transceiver by subtracting the power variation of the first I/Q signal from the gain of power adjustment for the first RF transceiver; and
update the gain of power adjustment for the second RF transceiver by adding the power variation of the first I/Q signal to the gain of power adjustment for the first RF transceiver.

11. The relay amplification system according to claim 7, wherein the baseband chip is further configured to:
in response to power of a first transmit signal output by the second RF transceiver to the second antenna reaching a rated power, control the gain of power adjustment for the first RF transceiver and/or the gain of power adjustment for the second RF transceiver according to the power variation of the first I/Q signal, to make the power of the first transmit signal remain at the rated power.

12. The relay amplification system according to claim 7, wherein the baseband chip is further configured to:
determine whether power of a third I/Q signal output by the second RF transceiver changes with respect to power of a fourth I/Q signal output by the second RF transceiver, the third I/Q signal being an I/Q signal corresponding to a current sub-frame received by the second antenna, and the fourth I/Q signal being an I/Q signal corresponding to a previous sub-frame received by the second antenna; and
in response to the power of the third I/Q signal changing with respect to the power of the fourth I/Q signal, control a gain of power adjustment for the second RF transceiver and a gain of power adjustment for the first RF transceiver respectively according to a power variation of the third I/Q signal, to make the power of the third I/Q signal remain unchanged with respect to the power of the fourth I/Q signal and the link gain between the first antenna and the second antenna remain unchanged.

13. The relay amplification system according to claim 12, wherein in terms of controlling the gain of power adjustment for the second RF transceiver and the gain of power adjustment for the first RF transceiver respectively according to the power variation of the third I/Q signal, the baseband chip is configured to:
update the gain of power adjustment for the second RF transceiver by subtracting the power variation of the third I/Q signal from the gain of power adjustment for the second RF transceiver; and
update the gain of power adjustment for the first RF transceiver by adding the power variation of the third I/Q signal to the gain of power adjustment for the second RF transceiver.

14. The relay amplification system according to claim 12, wherein the baseband chip is further configured to:
in response to power of a second transmit signal output by the first RF transceiver to the first antenna reaching a rated power, control the gain of power adjustment for the first RF transceiver and/or the gain of power adjustment for the second RF transceiver according to the power variation of the third I/Q signal, to make the power of the second transmit signal remain at the rated power.

15. A non-transitory computer readable storage medium storing computer programs, wherein when executed by a processor, the computer programs are operable with the processor to execute:
determining whether power of a first in-phase/quadrature (I/Q) signal output by a first RF transceiver changes with respect to power of a second I/Q signal output by the first RF transceiver, the first I/Q signal being an I/Q signal corresponding to a current sub-frame received by the first antenna, and the second I/Q signal being an I/Q signal corresponding to a previous sub-frame received by the first antenna; and in response to the power of the first I/Q signal changing with respect to power of the second I/Q signal, controlling a gain of power adjustment for the first RF transceiver and a gain of power adjustment for a second RF transceiver respectively according to a power variation of the first I/Q signal, to make the power of the first I/Q signal remain unchanged with respect to the power of the second I/Q signal and a link gain between the first antenna and the second antenna remain unchanged.

16. The non-transitory computer readable storage medium according to claim 15, wherein in terms of controlling the gain of power adjustment for the first RF transceiver and the gain of power adjustment for the second RF transceiver respectively according to the power variation of the first I/Q signal, the computer programs are operable with the processor to execute:

updating the gain of power adjustment for the first RF transceiver by subtracting the power variation of the first I/Q signal from the gain of power adjustment for the first RF transceiver; and updating the gain of power adjustment for the second RF transceiver by adding the power variation of the first I/Q signal to the gain of power adjustment for the first RF transceiver.

17. The non-transitory computer readable storage medium according to claim 15, wherein the computer programs are further operable with the processor to execute:

in response to power of a first transmit signal output by the second RF transceiver to the second antenna reaching a rated power, controlling the gain of power adjustment for the first RF transceiver and/or the gain of power adjustment for the second RF transceiver according to the power variation of the first I/Q signal, to make the power of the first transmit signal remain at the rated power.

18. The non-transitory computer readable storage medium according to claim 15, wherein the computer programs are further operable with the processor to execute:

determining whether power of a third I/Q signal output by the second RF transceiver changes with respect to power of a fourth I/Q signal output by the second RF transceiver, the third I/Q signal being an I/Q signal corresponding to a current sub-frame received by the second antenna, and the fourth I/Q signal being an I/Q signal corresponding to a previous sub-frame received by the second antenna; and in response to the power of the third I/Q signal changing with respect to the power of the fourth I/Q signal, controlling a gain of power adjustment for the second RF transceiver and a gain of power adjustment for the first RF transceiver respectively according to a power variation of the third I/Q signal, to make the power of the third I/Q signal remain unchanged with respect to the power of the fourth I/Q signal and the link gain between the first antenna and the second antenna remain unchanged.

19. The non-transitory computer readable storage medium according to claim 18, wherein in terms of controlling the gain of power adjustment for the second RF transceiver and the gain of power adjustment for the first RF transceiver respectively according to the power variation of the third I/Q signal, the computer programs are operable with the processor to execute:

updating the gain of power adjustment for the second RF transceiver by subtracting the power variation of the third I/Q signal from the gain of power adjustment for the second RF transceiver; and updating the gain of power adjustment for the first RF transceiver by adding the power variation of the third I/Q signal to the gain of power adjustment for the second RF transceiver.

20. The non-transitory computer readable storage medium according to claim 18, wherein the computer programs are further operable with the processor to execute:

in response to power of a second transmit signal output by the first RF transceiver to the first antenna reaching a rated power, controlling the gain of power adjustment for the first RF transceiver and/or the gain of power adjustment for the second RF transceiver according to the power variation of the third I/Q signal, to make the power of the second transmit signal remain at the rated power.

* * * * *